Dec. 1, 1925.

H. W. NICHOLS 1,563,644

WAVE RECEIVING SYSTEM

Filed Dec. 13, 1924

S-Incoming signal
L-Locally generated
I-Interference

Frequency-kilocycles

Inventor
Harold W. Nichols
by E. W. Adams Atty.

Patented Dec. 1, 1925.

1,563,644

UNITED STATES PATENT OFFICE.

HAROLD W. NICHOLS, OF MAPLEWOOD, NEW JERSEY, ASSIGNOR TO WESTERN ELECTRIC COMPANY, INCORPORATED, OF NEW YORK, N. Y., A CORPORATION OF NEW YORK.

WAVE-RECEIVING SYSTEM.

Application filed December 13, 1924. Serial No. 755,600.

*To all whom it may concern:*

Be it known that I, HAROLD W. NICHOLS, a citizen of the United States of America, residing at Maplewood, in the county of Essex and State of New Jersey, have invented certain new and useful Improvements in Wave-Receiving Systems, of which the following is a full, clear, concise, and exact description.

This invention relates to carrier wave receiving systems, and is particularly applicable to radio receiving systems employing the intermediate frequency or double detection method.

An object of this invention is to eliminate the effect of interfering signal waves in a radio receiving system.

A feature employed in attaining this end is the utilization of both the sum and the difference frequency components in a receiving system employing the intermediate frequency method.

In receiving by the intermediate or double detection method, incoming signal waves are combined with locally generated oscillations of a different frequency, and the combination is detected to produce a beat note equal to the difference of these two frequencies. This difference frequency is then selected, amplified, and again detected.

When there is present an interfering signal whose frequency differs from that of the locally generated oscillations by an amount equal to, or approximately equal to, the difference between the desired incoming signal and the locally generated oscillations, it is very difficult to separate these and to eliminate the effect of the interfering signal. One method of eliminating this effect is to shift the frequency of the locally generated oscillations; but if there are present several interfering signals of different frequency, this method may not be entirely effective.

The present arrangement alleviates this difficulty by utilizing both the sum and difference components of the incoming signal wave and a locally generated oscillation, i. e., the sum and difference components resulting from intermediate frequency detection are selected, separately detected, and combined in a receiver.

Figure 1:
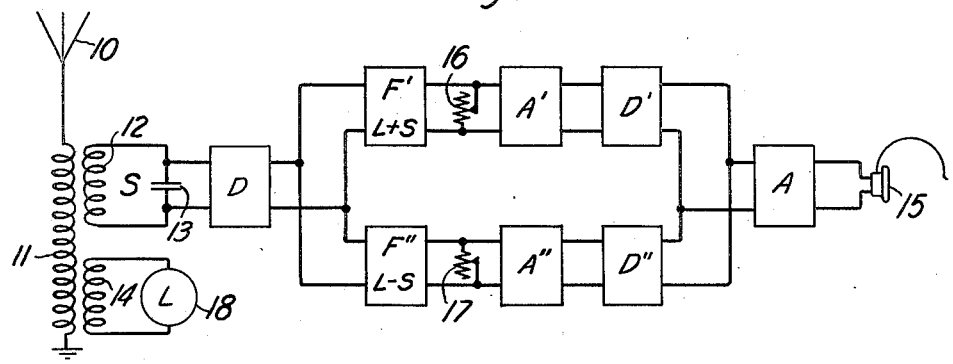
Figure 2:
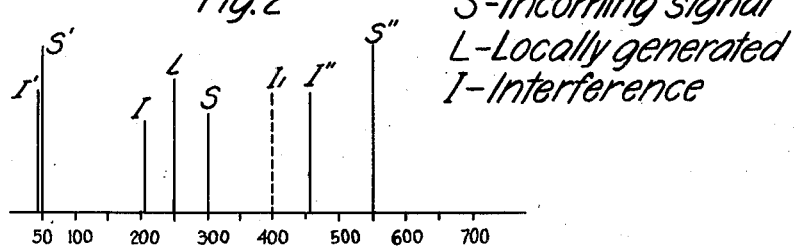

A clear understanding of the features of this invention may be obtained by reference to the drawings in which:

Fig. 1 is a circuit diagram illustrating an embodiment of the features of this invention; and Fig. 2 is a chart showing the relation between incoming signal waves, locally generated oscillations, and interfering signal waves.

Referring to Fig. 1, incoming high frequency signal waves, intercepted by antenna 10, pass through coil 11 to ground. Corresponding signal waves are set up in the tuned circuit comprising inductance 12 and capacity 13. Local oscillator or generator 18 supplies waves of an intermediate frequency to the detector D through the inductance coils 14, 11, and 12. Incoming signal waves of frequency S are impressed, along with locally generated waves of frequency L from source 18, upon the detector D which may be of any well-known type. Waves of frequencies S and L beat together to produce waves of a frequency L+S and L—S, i. e., waves having frequencies equal to the sum and difference of the frequencies of the two waves. The sum component or frequency L+S passes through filter F′, selective of that frequency, through the amplifier A′ to the detector D′ which may be of any well-known type. The difference component or frequency L—S passes through filter F″, selective of that frequency, through the amplifier A″ to detector D″ similar to detector D′. The waves impressed upon the detectors D′ and D″ produce the same signal waves in the output circuits of the detectors. The signal waves are combined and impressed upon amplifier A, and the resultant amplified waves received by receiver 15. Gain control devices comprising adjustable resistances 16 and 17 are shunted across the two branches of the circuit.

Referring now to Fig. 2, S represents incoming signal waves having a frequency of, for example, 300 kilocycles. In this case, the frequency L of the locally generated oscillations may be taken to be 250 kilocycles. An interfering signal wave of frequency I has a frequency of 203 kilocycles, and a second interfering signal having the frequency designated by $I_1$ has a frequency of 400 kilocycles. The sum and difference components produced by the combination of waves of frequencies S and L are represented by S″ and S′ with values of 550 and 50 kilocycles, respectively. The sum and difference components resulting from combining waves of frequencies L and I are represented by I″ and I′ with values of 453 and 47 kilocycles, respectively.

*Operation.*

In the system illustrated in Fig. 1, incoming signal waves having a frequency S of 300 kilocycles (Fig. 2) are impressed along with locally generated oscillations L having a frequency of 250 kilocycles upon the detector D, the result being waves equal to the sum of S+L or S″ of 550 kilocycles frequency, and waves equal to the difference of S−L or S′ of 50 kilocycles frequency. In accordance with the usual practice only the waves of 50 kilocycles frequency are selected to be further amplified and detected.

However, if there is present an interfering signal I of frequency 203 kilocycles, the difference of L and I will be waves of 47 kilocycles frequency, which can be separated from the desired waves only with great difficulty. In some cases, the value of L is shifted to 350 kilocycles; but there may be also present an interfering signal in the neighborhood of 400 kilocycles, and a similar difficulty will arise. If there are several sources of interfering signals spread throughout the spectrum, it may be impossible to set the local oscillator in such a way as to fully avoid these interfering signals.

The present invention provides means whereby the detrimental effects of such interfering signals may be reduced. Thus, in the present arrangement, the waves of frequency S′ and S″ are selected by filters F′ and F″ and separately amplified by amplifiers A′ and A″ and detected by detectors D′ and D″. The resultant waves are combined and amplified by amplifier A and received by receiver 15.

It may be seen that an interfering signal of frequency I which would tend to interfere with the difference frequency S′ would not produce frequency components in the neighborhood of the frequency S″ and consequently would have no effect upon sum frequency S″. Likewise a signal offering interference to the component of frequency S″ would have no effect upon S′.

It will usually be desirable to have gain controls such as resistance shunts 16 and 17 or other equivalent devices in each branch of the circuit; so that in case an interference as represented by I (Fig. 2) is present, the lower branch may be made less efficient and reception carried on principally over the upper branch. However, in general, both branches will be used, and the relative intensities of the waves traversing the two branches regulated to get the maximum signal with the minimum interference.

The filter F′ which passes the higher frequencies, may be a simple tuned circuit capable of wide variation, while the filter F″ which passes waves of lower frequencies will ordinarily be fixed. However, either or both of the selective circuits F′ and F″ may be band-pass filters or selective tuned circuits, their requirement being such a degree of selectivity as to transfer to the detectors bands of frequencies representing the desired signals and to exclude undesired waves without the range of the signaling band.

If it is so desired a single amplifier may be inserted in the line between the detector D and the filters F′ and F″, thereby eliminating the necessity of employing an amplifier in each branch of the circuit. In some instances this arrangement might suffice.

It is to be understood that the present invention is not to be confined to the illustrated embodiment or the illustrated values of frequencies given, but is limited only by scope of the appended claims.

What is claimed is:

1. The method of receiving signals which comprises combining incoming signal waves with locally generated oscillations of a different frequency, selecting the resultant sum and difference frequency components, separately detecting said components and combining and indicating the detected waves.

2. The method of receiving signals which comprises receiving incoming signal waves of a desired frequency, supplying locally generated oscillations of a different frequency, combining and impressing the waves of the two different frequencies upon a detector, selecting the resultant sum and difference frequency components, separately amplifying and detecting said components, and combining and indicating the detected waves.

3. In a radio receiving system, a source of incoming signal waves of a desired frequency, a source of locally generated oscillations of a different frequency, means for combining said waves of different frequency to produce sum and difference frequency components, means for selecting said components, means for separately detecting said components, and means for combining and receiving the waves resulting from said detection.

4. In a radio system wherein incoming signaling waves are beat with locally generated oscillations of a different frequency to produce sum and difference frequency components, means for utilizing both of said components comprising a pair of circuits each containing a selective circuit and a detector, and means for combining and receiving the resultant detected waves.

5. In a system in accordance with claim 4, means for rendering either of said circuits less efficient than the other.

6. A receiving system comprising an incoming wave receiving circuit, a local source, means to combine waves from said source with the incoming waves to produce sum and difference frequency waves, separate channels for separately selecting and transferring with independent attenuations or gains the sum and difference frequency waves, detecting means for said sum and difference frequency waves, and means for combining the forces resulting from the operation of said detecting means.

In witness whereof, I hereunto subscribe my name this 12th day of December A. D., 1924.

HAROLD W. NICHOLS.